United States Patent [19]

Holland et al.

[11] 3,996,171

[45] Dec. 7, 1976

[54] POLYMERIC FOAM AND METHOD FOR MAKING THE SAME

[75] Inventors: Ray W. Holland; John F. Fellers, both of Knoxville, Tenn.

[73] Assignee: Tennessee Applied Plastics, Inc., Knoxville, Tenn.

[22] Filed: Aug. 11, 1975

[21] Appl. No.: 603,352

[52] U.S. Cl. .................. 260/2.5 HA; 260/33.6 PQ; 264/53; 264/DIG. 5
[51] Int. Cl.² .......................................... C08J 9/28
[58] Field of Search ........................ 264/53, DIG. 5; 260/2.5 HA

[56] References Cited
UNITED STATES PATENTS

| | | | |
|---|---|---|---|
| 2,927,904 | 3/1960 | Cooper | 260/2.5 HA |
| 3,856,717 | 12/1974 | Theard et al. | 260/2.5 HA |

*Primary Examiner*—Morton Foelak
*Attorney, Agent, or Firm*—Fitch, Even, Tabin & Luedeka

[57] ABSTRACT

A polyethylene or polypropylene foam and a method for its manufacture in which polyethylene or polypropylene powder, is mixed with a liquid component, e.g. mineral oil, to a substantially uniform blend and placed in a container such as a closed mold. The mixture is heated to a temperature at which the polymer flows and is in a substantially liquid state such that the intimately mixed polymer and mineral oil enter into a solution, the solution forming in situ in the container. Thereafter, upon further heating, the mineral oil is caused to undergo a phase change from a liquid to a vapor at its boiling temperature, whereupon the mineral oil acts to expand the polymer into a foam. The temperature to which the solution is heated is maintained to less than the temperature at which the polymer foam collapses due to lowering of its viscosity, thereby ensuring that the foam structure is maintained. The foam thus produced is cooled and removed from the mold.

4 Claims, 2 Drawing Figures

POLYMERIC FOAM AND METHOD FOR MAKING THE SAME

This invention relates to polyethylene and polypropylene foams and their manufacture.

Polymeric foams and processes for making the foams have been explored extensively heretofore. In connection with such foams and methods, it has been common to require close temperature-time control, use of processing aids (at times requiring exotic chemical blowing agents), and/or other process controls in order to produce an acceptable foam. The present inventors have found that through a series of simple steps a reproducible stable polyethylene or polypropylene foam is provided at a relatively low cost, such process embodying procedures that ensure uniformity of the foam product as regards such characteristics as its cell size, strength, etc. It is therefore an object of the present invention to provide a polyethylene or polypropylene foam. It is also an object to provide a process for producing a polyethylene or polypropylene foam.

Other objects and advantages of the invention will be recognized from the following description including the claims and the drawings in which:

As disclosed herein, polyethylene or polypropylene powder, is mixed with a liquid component, e.g. mineral oil, to a substantially uniform blend and placed in a container such as a closed mold. The mixture is heated to a temperature at which the polymer flows and is in a substantially liquid state such that the intimately mixed polymer and mineral oil enter into a solution, the solution forming in situ in the container. Thereafter, upon further heating, the mineral oil is caused to undergo a phase change from a liquid to a vapor at its boiling temperature, whereupon the mineral oil acts to expand the polymer into a foam. The temperature to which the solution is heated is maintained to less than the temperature at which the polymer foam collapses due to lowering of its viscosity, thereby ensuring that the foam structure is maintained. The foam thus produced is cooled and removed from the mold.

The present invention is highly dependent upon the phase relationships of the polymer and mineral oil. To simplify the disclosure, polyethylene is referred to as the polymer, but it is to be recognized that polypropylene may be foamed using the disclosed principles. Greatly simplified, each of polyethylene and mineral oil may be represented as follows:

Polyethylene $CH_3 [CH_2 - CH_2]_n CH_3$ $n \cong 1000$ to $5000$

Mineral Oil $CH_3 [CH_2]_x CH_3$ $x = 8$ to $14$

This it is seen that these two materials appear as homologues differing in their molecular weights.

Figure 1:
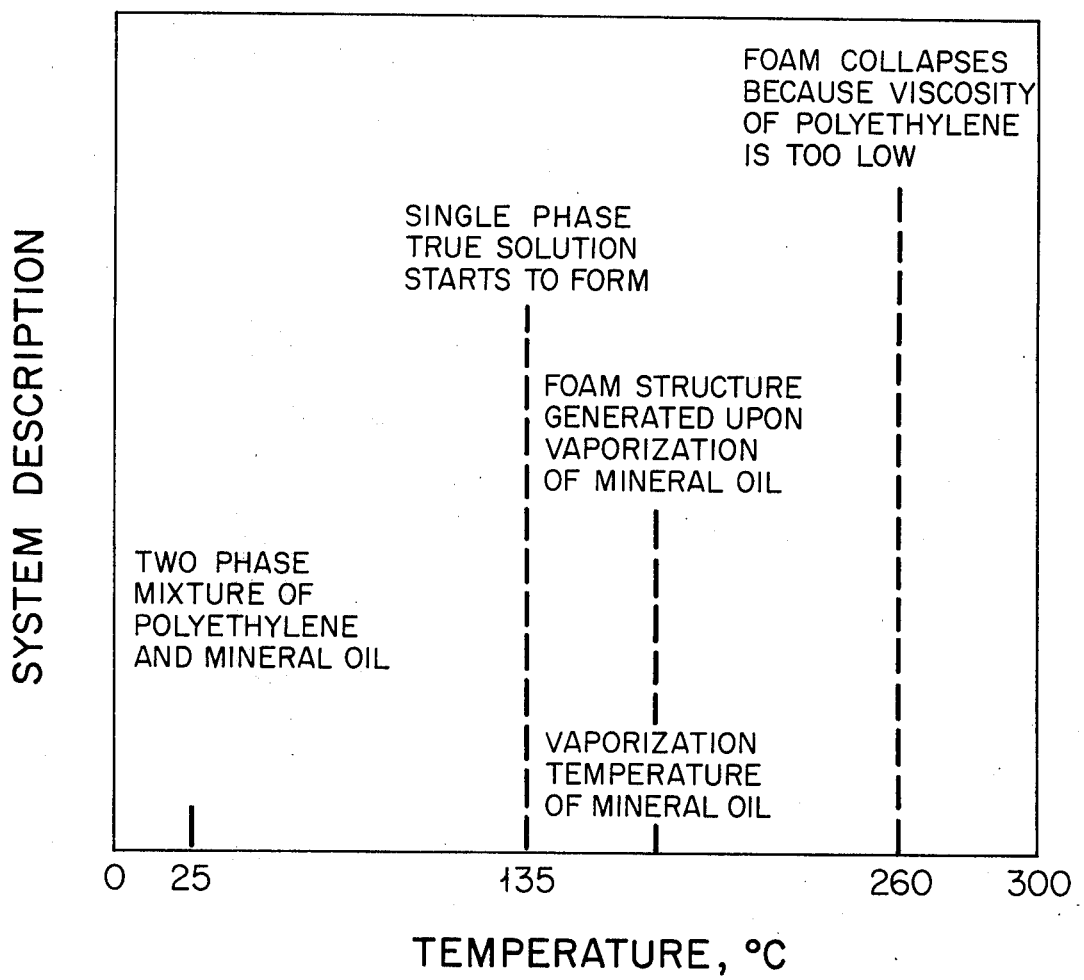
FIG. 1 is a representation of certain phase relationships of polyethylene and a mineral oil.

Referring to FIG. 1, it has been observed that in a combined system of polyethylene and mineral oil, these materials may exist as a two phase physical mixture, or as a two component single phase solution. Under room temperature and atmospheric pressure conditions, the polyethylene and mineral oil exist as a two phase physical mixture. As the temperature of the system is increased, at one atmosphere pressure, the materials eventually form a single phase solution, where the mineral oil is still a liquid in this temperature range. Such single phase solution has been observed to occur just above the crystalline melting temperature of polyethylene, i.e. about 135° centigrade (C°). It has been further discovered that by raising the temperature of the system further, the mineral oil undergoes a phase change from a liquid to a vapor at its vaporization temperature and, at this temperature, the mineral oil acts to expand the polymer into a foam. To successfully expand the polymer by the present means, the vaporization temperature of the chosen mineral oil is to be above the crystalline melting temperature of the polyethylene, but not by greater than about 125° centigrade. If one exceeds this upper temperature limit, the viscosity of the polyethylene can be reduced to a point where a foam structure cannot be supported. It is to be recognized that the vaporization takes place while the polymer and mineral oil are in an in situ solution state, and as a consequence, the mineral oil is both intimately associated with the polymer and uniformly distributed throughout the system so that the resulting foam structure is uniform in cell size, aside from a "skin" on the foam as will be further referred to hereinafter. Blow holes are not observed in the product.

The polyethylene employed in the manufacture of the disclosed foam is in powder form, such being readily available from commercial sources. Being in powder form, the polyethylene is readily and intimately mixed with the mineral oil to aid in insuring homogeniety of the mixture as it passes through the several physical states, without further mechanical mixing after the initial admixture of the powder and mineral oil. Either high density polyethylene (specific gravity from about 0.940 to 0.970) (HDPE) and low density polyethylene (specific gravity from about 0.9910 to 0.9935) (LDPE) powder are suitable for use in the present process, the HDPE powder producing a higher density foam product, assuming all other parameters are equal. The particle size and size distribution of the powder employed varies, depending in part upon the desired prefoam density of the mixture in the mold. Also, the choice of particle size distribution affects the number and size of the interstices between the powder particles when packed in a mold, the presence of a portion of fine particles tending to enter and fill the interstices, yielding a more closely compacted mixture of powder and mineral oil.

As noted above, the number of ethylene radicals in the polyethylene molecule is between 1000 and 5000. The polyethylene compounds falling within this range possess individual crystalline melting temperatures that are compatible with the anticipated phase changes of the mineral oils that fall within the noted formulation range for this latter material. That is, the molecular weight of a particular polymer, hence the crystalline melting temperature of the polymer, must be less than the boiling point (vaporization temperature) of the mineral oil so that a solution of the polymer and mineral oil is formed prior to vaporization of the mineral oil, thereby providing for the homogeniety of the system at the time the polymer is expanded, and resultant uniformity of the product properties. Similarly, the molecular weight of the polymer must also be such as provides a polymer whose viscosity is sufficient at and just above the vaporization temperature of the chosen mineral oil to support the foam structure until cooling and resultant rigidification of the foam can be accomplished following the expansion of the polymer. Such relationships of the polymer and mineral oil are observable from FIG. 1. In the system of polyethylene and mineral oil, the acceptable combinations of molecular weights of each material is found to fall within the ranges set forth above, i.e., where the number of ethylene radicals in the polyethylene varies between about 1000 and about 5000 and the number of methylene radicals in the mineral oil varies between about 8 and about 16.

As noted above, it is to be understood that in referring to polyethylene in the present disclosure, it is not intended to limit the invention to only this specific polymer. It is intended however to include other polymers whose properties are compatible with the stated necessary relationships between the polymer and the mineral oil. By way of example, polypropylene having a formulation as follows has been found to form a desirable foam when processed in accordance with the present invention:

Polypropylene

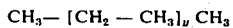

$y \cong 1000$ to $5000$

Other useful polymers will be apparent to one skilled in the art when given the present disclosure.

As known in the art, the term "mineral oil" generally refers to a family of aliphatic compounds having the simplified formulation set forth above. The individual members of this family of interest in the present invention are of the characteristic oily nature and are liquid under standard conditions of temperature and pressure. Under standard conditions of temperature and pressure, they are chemically inert with respect to the polymer employed in the present process. As referred to above, the choice of mineral oil for use in making the disclosed foam is dependent upon the crystalline melting temperature of the polymer in that the oil must exist in the liquid state at the outset and remain in the liquid state as the polymer passes from its solid state to its liquid state so that a single phase solution is formed in situ between the polymer and the oil prior to vaporization of the oil. This, of course, requires that the oil have a vaporization temperature higher than the crystalline melting temperature of the polymer. As further noted above, such vaporization temperature of the oil must not exceed that temperature at which the viscosity of the polymer becomes too low to support a foam structure. In general, it has been found that the preferred foams are most consistently reproduced when the vaporization temperature of the oil is about 25° to 50° Centigrade higher than the crystalline melting temperature of the polymer and no higher than about 25° C. less than that temperature at which the foam structure collapses.

In a preferred process for making the disclosed foam, about 15 parts by volume of powder is blended with about one part by volume of mineral oil at room temperature and atmospheric pressure until there is substantially uniform distribution of the mineral oil throughout the powder and the surface of each powder particle is covered with the oil. This process step is successfully carried out by either batch or continuous mixing procedures known in the art. By way of example, the polymer powder and oil are successfully blended in a batch by means of a laboratory blender.

The blended two-phase mixture of polymer and mineral oil is transferred to a container, such as a mold, that is closed (but not gas tight) after loading. The mixture in the mold is heated at atmospheric pressure to a temperature about 50° C. less than the temperature at which the viscosity of the polymer becomes too low to support a foam structure. The heating preferably is continuous and at a rate of increase that permits the described transition from a two-phase mixture to a single-phase solution to substantially occur prior to the temperature of the mixture reaching the vaporization temperature of the mineral oil, thereby ensuring the desired homogeniety and intimacy of the polymer and oil prior to blowing. As the heating is continued through the vaporization temperature of the oil, it vaporizes while the polymer is liquid and blows the polymer into a foam. The maximum temperature of the system preferably is held for a time sufficient to insure the desired expansion of the polymer. Thereafter, the foam, in the container, is cooled to room temperature and subsequently removed. The cooling step may be carried out in steps but preferably is effected rapidly and continuously, for example, as by immersing the container in water.

It has been discovered that upon cooling of the foam, there is no appreciable visible condensation and deposition of the mineral oil interiorly of the foam, leading to the suppositon that possibly substantial decomposition of the oil takes place. This supposition, however, has not been conclusively shown and all chemical and physical changes occurring in the oil are not known. Aside from vaporization, it has been observed that a small quantity of oil appears on the surface of the foam product and the possibility exists that under conditions not now known that additional oil may exude from or otherwise be expelled from the foam on standing subsequent to its demolding. In any event, no deleterious effect on the foam by the presence, if any, of mineral oil has been noted, the surface oil being readily removable by washing or otherwise treating the foam with a cleansing agent or agents. For example, washing the foam with water and a detergent quickly and easily removes the surface oil. On the other hand, the presence of the oil on the external surface of the product has been found to advantageously function as a type of mold release agent that aids in removal of the product from the mold.

The foam product obtained by the present process is of the closed-cell type and has a substantially uniform cell size. In general the cells are relatively small, ranging between about 0.1 millimeter and about 1 millimeter in diameter, depending upon the ratio of powder to mineral oil. The foam further exhibits a surface skin that increases in density toward the outer surface of the product, the skin being essentially of the characteristic density of the polymer at the extreme outer surface and decreasing to the characteristic density of the foam. This skin will vary in thickness, but usually is less than about 3 millimeters thick on small (80 cubic centimeters) products and thicker on larger products. The foam with the skin is useful in certain products, but the skin may be removed by mechanical means where such is desired in other products.

EXAMPLE I

A polyethylene foam in accordance with the present invention was produced using the disclosed process by blending 240 parts by volume of high-density polyethylene powder with 16 parts by volume of mineral oil in a mixer for about 20 minutes. The polyethylene powder was that sold commercially by Allied Chemical Co. and designated Allied Chemical 43A HDPE ("GREX" Div). The molecular weight of this polyethylene indicated an average of about 2500 ethylene radicals in each molecule. The viscosity of the polyethylene was about $3 \times 10^4$ poise at about 220° C. indicating that it would not support a foam structure at a temperature very much above about 220° C. Its crystalline melting temperature was about 130° C. Accordingly, the mineral oil used in this example exhibited a vaporization temperature range of about 170° to 200° C.

The two-phase mixture of polyethylene powder and mineral oil was loaded into an annular mold. The mold in the present example comprised a length of 21.6 millimeter (mm) external diameter aluminum tubing having a 2.9 mm thick wall, disposed concentrically within a length of 41.3 mm internal diameter aluminum tubing having 3.6 mm wall thickness. The annular space between the two lengths of tubing was sealed at one end of the mold, the mixture was packed into the annular space defined by the lengths, and thereafter the opposite end of the annular space was closed. This filled mold was placed in an oven preheated to about 220°–230° C. and heated for one hour. Thereupon the mold with its contents was chilled by immersing it in tap water at approximately room temperature. After cooling to about the temperature of the water, the mold was opened and the annular foam product removed.

Upon examination it was found that the foam possessed an outer skin about 1.6 mm thick whose density was substantially equal to the density of nonfoamed polyethylene. The foam, being annular, possessed an inner skin about 0.8 mm thick which was of like density as the outer skin. The foam, between the skins exhibited closed-cells and had a density of approximately 0.5 g/cm³. The cells were substantially uniform in size and distribution, a typical cell measuring about 0.1 mm in diameter. The outer surface of the foam was smooth and free of defects such as blow holes. Its size was substantially the same as the size of the annular mold cavity.

EXAMPLE II

A polypropylene foam was made using the same procedures, same formulation, same mineral oil, and same mold as used in Example I, except that the blended mixture was heated in an oven preheated to about 230°–240° C. The polypropylene powder was that sold commercially by Shell Oil Co. and designated as P520-1000, 6RWC378.

In this Example, the polypropylene foam product exhibited a smooth, defect-free outer surface and similar skin properties as the polyethylene foam. The cells were closed, uniform in size and distribution, and exhibited a typical cell diameter of about 0.1 mm.

A specimen 1.27 centimeters wide by 1.27 centimeters long by 1.23 centimeters thick was taken from the polypropylene foam produced as per Example II and tested for its compressive strength. The specimen has a thin skin on two of its faces (the opposite faces of the 1.23 cm. dimension). It was placed between the loading plates of a Houndsfield Tensometer adapted as suggested by the manufacturer to develop compressive strength data, with the skin-bearing sides of the specimen in contact with the plates so that the applied load was exerted against the foamed central portion of the specimen. A load was applied to the specimen at the rate of 453 kilograms per minute. A second specimen 2.54 centimeters wide by 2.54 centimeters long by 1.22 centimeters thick of the same polypropylene foam as the first specimen was tested in the same manner as the first specimen. The data from these two tests are given in FIG. 2.

Figure 2:
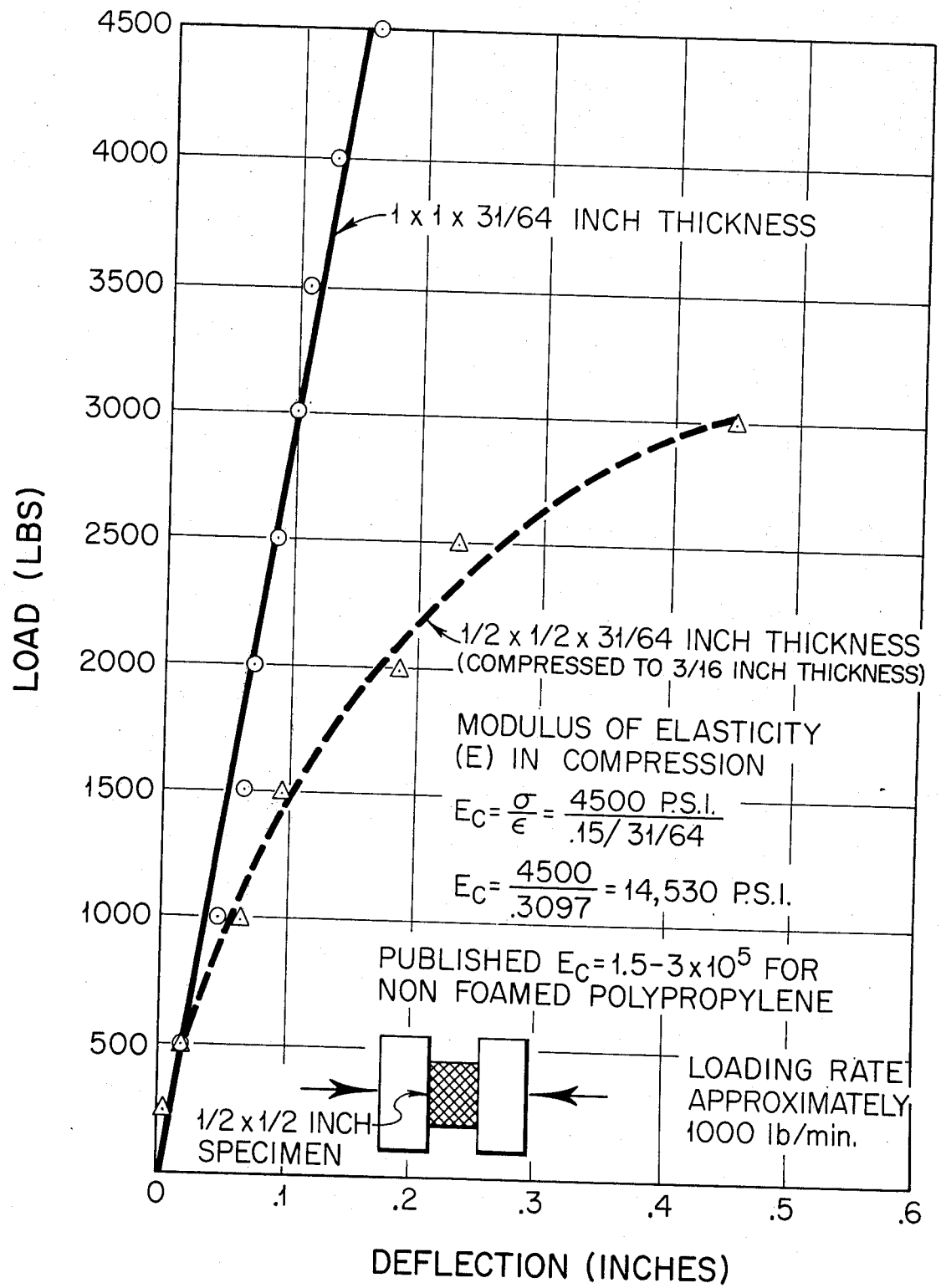
FIG. 2 is a graphic representation of certain compressive strength data.

Using the data of FIG. 2, the compressive strength of the foam, $E_c$, equals 4274 kilograms per square centimeter. The foam compressed to less than one-half of its original thickness and exhibited a strong cold-flow property. The foam was observed to have high toughness in compression.

Modified Izod tests confirmed the physical characteristics exhibited in the compression tests and showed the product to be unusually strong.

EXAMPLE III

A foam was made as described in Example I, except that a powdered pigment in the amount of 3 parts by volume was mixed with 30 parts by volume polymer powder and 2 parts by volume mineral oil. This pigment is identified as that sold by Flexible Products Co. of Marietta, Georgia and designated "Wilflex 2255 Yellow." This pigment was inert with respect to both the polymer and oil and therefore continued to exist during the entire manufacturing procedure as solid particulates distributed uniformly throughout the mixture and eventually throughout the product. Advantageously, these solid particles were found to serve as nucleating agents that enhanced the foam formation and resulted in more uniform cell size and less critical dependence upon the process temperatures for producing a satisfactory foam.

The present process lends itself to production of polymer foams on a commercial scale, for example, as by extrusion techniques in which the blended mixture of polymer powder and mineral oil is extruded through a heated die which is followed by a cooling section. This is possible due to the substantially instantaneous passage of the polymer and mineral oil into a single-phase solution provided for by reason of the initial intimacy of the oil with the polymer powder so that there is minimum time lag required in heating the mixture through the crystalline melting temperature of the polymer and then through the vaporization temperature of the mineral oil. Further, the foam may be cooled substantially instantaneously without apparent deleterious effects upon its physical properties.

Whereas the invention has been referred to and described herein in specific terms and examples, it is intended to limit the invention only in accordance with the appended claims.

What is claimed:

1. A process for the manufacture of polyethylene or polypropylene foam comprising the steps of
    admixing a quantity of powdered polymer consisting essentially of polyethylene or polypropylene with a quantity of a blowing agent consisting essentially of mineral oil at ambient conditions to produce a two-phase mixture of said polymer and said mineral oil in which said mineral oil is substantially uniformly distributed in said powdered polymer, said mineral oil having a vaporization temperature above the crystaline melting temperature of the polymer but not greater than about 125° C, introducing said mixture into a container and closing said container sufficiently to prevent the escape of said mixture but less than gas-tight, heating said container and its contents to at least the crystalline melting temperature of said powdered polymer whereby said polymer and said mineral form in situ a single phase solution, further heating said container and its contents at least to the vaporization temperature of said mineral oil but less than that temperature at which the viscosity of said polymer is reduced to the degree that said polymer is incapable of maintaining a foam structure, whereby a substantial portion of said mineral oil vaporizes and said polymer is expanded into a foam structure, and cooling said container and its contents.

2. The process of claim 1 in which said polymer is polyethylene having the general formulation:

$$CH_3 [CH_2 - CH_2]_n - CH_3$$

where $n$ is between about 1000 and about 5000 and in which the simplified formulation of said mineral oil is $$CH_3 [CH_2]_x - CH_3$$

where $x$ is between about 8 and about 14.

3. The process of claim 1 in which said polymer is polypropylene having the general formulation:

$$CH_3 - [CH_2-CH_3]_y - CH_3$$

where $y$ is between about 1000 and about 5000.

4. The process of claim 1 in which said container and its contents are heated to a maximum temperature of not greater than about 25° C. less than that temperature at which the viscosity of said polymer is reduced to the degree that said polymer is incapable of maintaining a foam structure.

* * * * *